US009148936B2

(12) United States Patent
Wagner et al.

(10) Patent No.: US 9,148,936 B2
(45) Date of Patent: Sep. 29, 2015

(54) INTEGRAL DIMMING PHOTO-CONTROL RECEPTACLE

(71) Applicant: ABL IP HOLDING LLC, Conyers, GA (US)

(72) Inventors: Phillip R. Wagner, Baltimore, OH (US); Rick Martin Kelly, Newark, OH (US); Michael Jay Dorogi, Newark, OH (US); Justin Charles Wilson, Westerville, OH (US); Edward R. McCracken, Jr., Pataskala, OH (US); Robert Burt, Columbus, OH (US)

(73) Assignee: ABL IP Holding LLC, Conyers, GA (US)

( * ) Notice: Subject to any disclaimer, the term of this patent is extended or adjusted under 35 U.S.C. 154(b) by 31 days.

(21) Appl. No.: 13/874,749

(22) Filed: May 1, 2013

(65) Prior Publication Data
US 2014/0302715 A1    Oct. 9, 2014

Related U.S. Application Data

(60) Provisional application No. 61/853,425, filed on Apr. 4, 2013.

(51) Int. Cl.
*H05B 37/02* (2006.01)

(52) U.S. Cl.
CPC ........ *H05B 37/0218* (2013.01); *H05B 37/0254* (2013.01); *H05B 37/0281* (2013.01); *Y02B 20/42* (2013.01); *Y02B 20/46* (2013.01); *Y02B 20/72* (2013.01)

(58) Field of Classification Search
CPC ............... H01R 13/567; H01R 13/432; H01R 2103/00; H01R 13/213
USPC ................................................... 439/651, 107
See application file for complete search history.

(56) References Cited

U.S. PATENT DOCUMENTS

| | | | |
|---|---|---|---|
| 2,924,806 A | 2/1960 | Hubbell et al. | |
| 3,066,276 A | 11/1962 | Hubbell et al. | |
| 3,083,347 A | 3/1963 | Fahey | |
| 3,112,973 A | 12/1963 | Von Holtz | |
| 3,206,709 A | 9/1965 | De Vore, Jr. | |
| 3,233,204 A | 2/1966 | De Vore, Jr. | |
| 3,292,135 A | 12/1966 | Robinson | |
| 3,339,171 A | 8/1967 | Carlson | |
| 3,350,675 A | 10/1967 | Misencik et al. | |
| 3,393,395 A | 7/1968 | Hubbell | |
| 3,500,291 A | 3/1970 | Hubbell et al. | |
| 3,601,660 A * | 8/1971 | Brandt et al. .................. 439/34 |
| 3,945,702 A | 3/1976 | Poliak et al. | |
| 3,949,211 A | 4/1976 | Elms | |
| 4,241,969 A | 12/1980 | D'Amato et al. | |

(Continued)

*Primary Examiner* — Gary Paumen
(74) *Attorney, Agent, or Firm* — Kilpatrick Townsend & Stockton, LLP

(57) ABSTRACT

Aspects provide photo-control receptacles having contact terminals via which control signals can be communicated. In one aspect, a photo-control receptacle is provided. The photo-control receptacle includes an interface having a neutral conductor and a line voltage conductor. Each of the neutral conductor and the line voltage conductor can form a first electrical connection for providing power to a photo-control via alternating current. The photo-control receptacle also includes one or more additional contact conductors adjacent to the interface. The one or more additional contact conductors can form a second electrical connection for providing control signals to the photo-control.

7 Claims, 7 Drawing Sheets

(56) References Cited

U.S. PATENT DOCUMENTS

| | | |
|---|---|---|
| 4,477,143 A | 10/1984 | Taylor |
| 4,653,834 A | 3/1987 | Norden |
| 4,695,769 A | 9/1987 | Schweickardt |
| 4,726,780 A | 2/1988 | Thackeray |
| 5,046,961 A | 9/1991 | Hoffman |
| 5,450,302 A | 9/1995 | Maase et al. |
| 5,593,318 A | 1/1997 | Bilson et al. |
| 5,641,310 A | 6/1997 | Tiberio, Jr. |
| 5,647,751 A | 7/1997 | Shulman et al. |
| 5,680,926 A | 10/1997 | Sandor et al. |
| 5,741,149 A | 4/1998 | Anthony |
| 5,823,833 A | 10/1998 | Castaldo |
| 6,328,581 B1 | 12/2001 | Lee et al. |
| 7,011,552 B2 | 3/2006 | Hoxha |
| 7,144,260 B2 | 12/2006 | Murayama et al. |
| 7,307,514 B2 | 12/2007 | McAden |
| 7,333,903 B2 | 2/2008 | Walters et al. |
| 7,493,100 B2 | 2/2009 | Welles, II et al. |
| 7,637,766 B2 | 12/2009 | Kauffman et al. |
| 7,828,463 B1 | 11/2010 | Willis |
| 8,038,481 B1 * | 10/2011 | Creighton et al. ............ 439/660 |
| 8,398,435 B2 * | 3/2013 | Aurongzeb et al. ..... 439/607.41 |
| 2006/0068644 A1 * | 3/2006 | Zauber ......................... 439/654 |
| 2006/0292905 A1 * | 12/2006 | Gilliland ...................... 439/107 |
| 2006/0292924 A1 * | 12/2006 | Spiri et al. .................... 439/535 |
| 2007/0149061 A1 * | 6/2007 | Oddsen et al. ................ 439/651 |
| 2008/0108252 A1 * | 5/2008 | Williams ................. 439/620.08 |
| 2009/0039799 A1 * | 2/2009 | Newman et al. ............. 315/291 |
| 2009/0050785 A1 | 2/2009 | Flaherty |
| 2009/0088021 A1 | 4/2009 | Kauffman et al. |
| 2009/0215302 A1 * | 8/2009 | Roberts ........................ 439/350 |
| 2010/0252715 A1 * | 10/2010 | Flaherty ....................... 250/206 |
| 2010/0267268 A1 * | 10/2010 | Hering et al. ................ 439/345 |
| 2011/0028013 A1 * | 2/2011 | Kim ............................. 439/218 |
| 2012/0086560 A1 | 4/2012 | Ilyes et al. |
| 2012/0086561 A1 | 4/2012 | Ilyes et al. |
| 2012/0139426 A1 * | 6/2012 | Ilyes et al. ................... 315/152 |
| 2012/0282815 A1 * | 11/2012 | Aurongzeb et al. .......... 439/660 |
| 2013/0044444 A1 * | 2/2013 | Creighton et al. ............ 361/752 |
| 2013/0280956 A1 * | 10/2013 | Cheng et al. ............. 439/620.15 |
| 2014/0162488 A1 * | 6/2014 | Staudigel et al. ............. 439/372 |

\* cited by examiner

INTEGRAL DIMMING PHOTO-CONTROL RECEPTACLE

CROSS-REFERENCE TO RELATED APPLICATIONS

This application claims priority to U.S. Provisional Application Ser. No. 61/853,425 filed Apr. 4, 2013 and titled "Integral Dimming Photocontrol Receptacle," the contents of which are hereby incorporated by reference.

FIELD OF THE INVENTION

The present invention is directed to photo-control receptacles and more particularly relates to photo-control receptacles and/or photo-control devices having contact terminals through which a control signal can be provided.

BACKGROUND

Control of street and area lighting may include a timing mechanism and/or a switching mechanism disposed in a solid-state control device or other suitable control device known as a photo-control. Control of a luminaire or other lighting device may include simple on/off switching Improvements to photo-control for controlling a lighting device are desirable.

SUMMARY

Photo-controls are provided that include contact terminals via which control signals can be communicated.

In one aspect, a photo-control receptacle is provided. The photo-control receptacle includes an interface having a neutral conductor and a line voltage conductor. Each of the neutral conductor and the line voltage conductor can form a first electrical connection for providing power to a photo-control via alternating current. The photo-control receptacle also includes at least one additional contact conductor adjacent to the interface. The at least one additional contact can form a second electrical connection for providing control signals to the photo-control.

DETAILED DESCRIPTION

Figure 1:
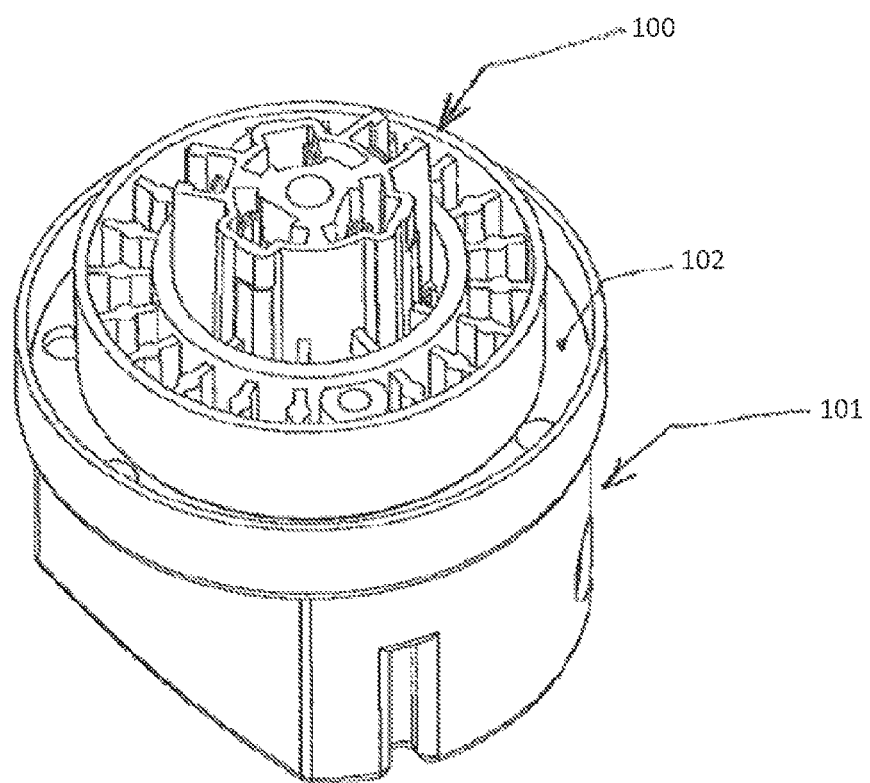
FIG. 1 is a perspective view of an example photo-control according to one aspect.

Certain aspects relate to a three-blade photo-control receptacle having contact terminals through which a control signal can be provided for allowing compatibility between non-dimming enabled controls, dimming enabled controls, dimming receptacle, and non-dimming receptacle. The control signal may be a 0 to 10 V control signal and the three-blade photo-control receptacle may have an industry standard three blade pattern, such as one complying with the ANSI 136.10-2010 standard.

In some aspects, photo-control receptacles are provided that have contact terminals via which a control signal can be communicated. The photo-control receptacle can include an interface having a neutral conductor and a line voltage conductor. Each of the neutral conductor and the line voltage conductor can form a first electrical connection for providing power to a photo-control via alternating current. The photo-control receptacles can also include at least one additional contact conductor adjacent to the interface. The at least one additional contact can form a second electrical connection for providing control signals to a photo-control.

A photo-control receptacle according to some aspects may be implemented in light management system in which intelligent luminaire managers are networked and provide for luminaire control and other functions. An example of a light management system in which certain aspects can be implemented is described in U.S. Pat. No. 7,333,903 to Walters, et al., titled "Light Management System Having Networked Intelligent Luminaire Managers with Enhanced Diagnostics Capabilities."

Control of street and area lighting can include a photo detector, an AC switch, and a timing mechanism contained in a solid-state control device known as a photo-control, which can be installed in an ANSI C136.10 standard three-blade receptacle wired to and physically located on or near the luminaire to be controlled. The three-blade interface can include a neutral conductor and a line voltage conductor. The neutral conductor and a line voltage conductor can provide power to the solid-state control. A third conductor of the three-blade interface can be switched by the solid state photo-control to selectively provide AC power to a luminaire ballast or driver. Selectively providing AC power to a luminaire ballast or driver can cause a controlled "on" or "off" state of the luminaire.

The adoption of electronic drivers within street and area lighting segments of the lighting industry, as well as the widespread adoption of LED light engines, has created an opportunity for increased lighting system control and flexibility. Improvements in lighting system efficiency can be achieved by adding dimming control to the traditional on/off control scheme. Adding dimming control can provide for dynamic lighting through intelligent or remotely controlled dimming photo-controls.

Two dimming methods can be supported in commercially available dimmable drivers. The dimming methods include a 0-10 V analog dimming control (International Electrical Commission ("IEC") 60929 Annex E) and Digitally Addressable Lighting Interface ("DALI") (IEC 62386-20x) communications. DALI can be a 16 VDC system. Electrical conductors and contacts that are designed for 16 VDC at 250 mA can use both methods. Both DALI communications and 0-10 V analog dimming control can involve using two conductors for the physical layer (i.e., signal transmission medium) of the Open Systems Interconnection ("OSI") model.

Photo-control receptacles according to certain aspects can expand traditional on/off AC switched control of a luminaire by augmenting a three-blade, AC-only electrical interface to include additional conductors that can carry a low voltage analog signal and/or a digitally modulated control signal to the luminaire driver.

Sets of additional electrical conductors can respectively be disposed in a photo-control and a photo-control receptacle. The sets of additional electrical conductors in the photo-control and the photo-control receptacle can mechanically and electrically mate at an interface between the photo-control and the photo-control receptacle through a series of electrical contacts. The photo-control can be removed from the photo-control receptacle and replaced periodically. The additional conductors and contacts can allow universal photo-control and receptacle physical compatibility (for example, provided devices adhere to the ANSI C136.10 standard dimensions).

In some aspects, a spring-type contact mechanism (for example, a leaf spring) can be included in the photo-control. Non-limiting examples of a spring-type contact mechanism can include a leaf spring and/or a terminal spring-loaded via a helical spring. A spring-type contact mechanism can be retracted or otherwise deflected out of the way by the photo control being installed in a traditional three-blade receptacle. A spring-type contact mechanism can mate electrically with a corresponding contact pad located on the face of a photo-control receptacle face, such as, for example, when installed on a new five-conductor receptacle. In some aspects, the spring-type contact mechanism includes a plunger style connector used in conjunction with a helical spring that provides the same retraction operation. In other aspects, the spring-type contact mechanism includes a formed wire spring.

A photo-control receptacle according to one aspect can include one leaf spring and contact pad pair (three blades plus one additional conductor in both the photo-control and receptacle) for non-isolated (line or neutral referenced) control signal applications.

A photo-control receptacle according to another aspect can include two-spring contact and contact pad pairs (three blades plus two additional contacts in both the photo-control and receptacle) for two-wire 0-10 V and DALI control signaling and/or isolated control signal applications.

In additional or alternative aspects, different spring contact and contact pad pairs can be implemented in the photo-control and/or the photo-control receptacle to provide different numbers of signal channels used for more complex control methods, such as those using more than two additional conductors. For example, both a 0-10 V analog and DALI interface can be supported with four additional spring/pad contact pairs.

In additional or alternative aspects, additional spring and pad contacts, regardless of the number employed in a particular design, can be positioned arcuately between the traditional three-blade conductors and an ANSI-defined photo-control gasket.

Certain aspects can provide universal compatibility between photo-controls and receptacles, capable of physically mating with an ANSI C136.10 compliant three-blade receptacle. Deflecting contacts can be positioned outside of the central standard blade area.

FIG. 1 depicts by perspective view an example of a photo-control 101 coupled or otherwise attached to the photo-control receptacle 100 via the photo-control base 102 of a photo-control 101.

Figure 2:
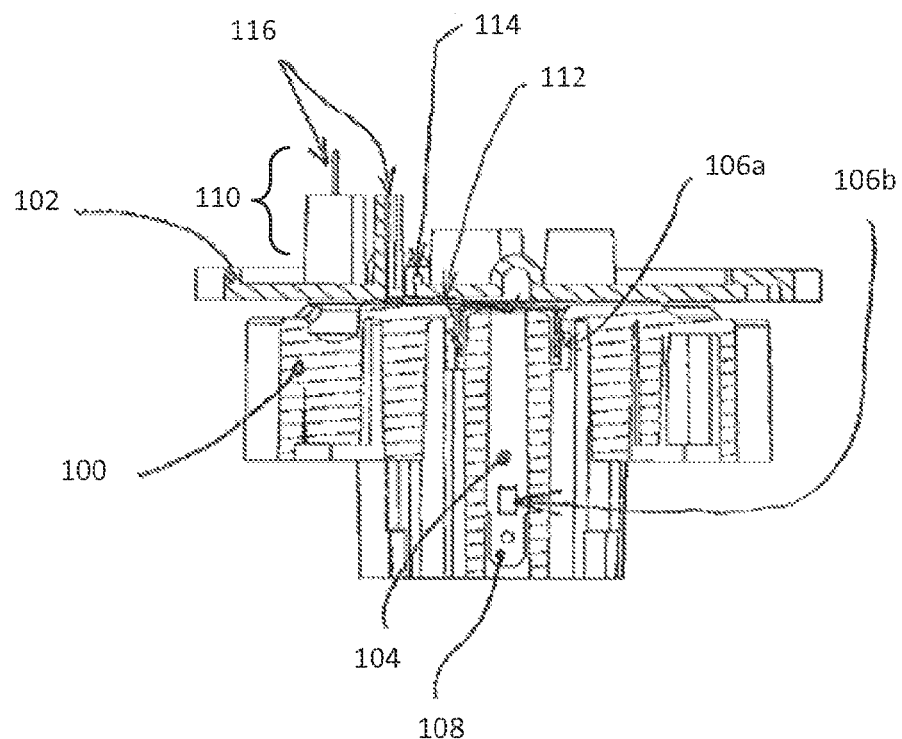
FIG. 2 is a cross-sectional side view of an example photo-control receptacle coupled to a photo-control base according to one aspect.

FIG. 2 depicts a cross-sectional side view of an example of a photo-control receptacle 100 electrically coupled to a photo-control base 102. The photo-control receptacle 100 includes contact pad terminals 104 and pad terminal retention tabs 106a, 106b. The contact pad terminals 104 can include quick-connect terminal ends 108. The photo-control base 102 includes a leaf spring assembly 110. The leaf spring assembly 110 can include leaf spring terminals 112, leaf spring terminal retention tab 114, and a leaf spring terminal riser pin 116.

Figure 3:
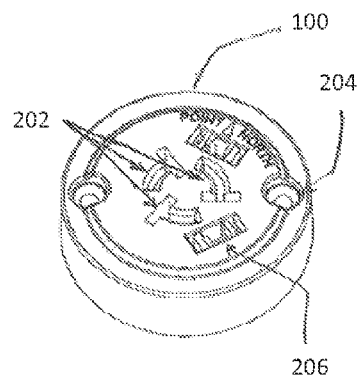
FIG. 3 is a perspective view of a top portion of the photo-control receptacle according to one aspect.
Figure 4:
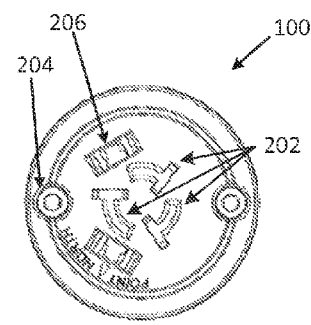
FIG. 4 is a top view of the photo-control receptacle according to one aspect.

FIG. 3 depicts a top side view of the photo-control receptacle 100 that can be coupled or otherwise attached to a photo-control receptacle 100. As depicted in FIG. 3, the photo-control receptacle 100 can include a three-blade interface 202, a mounting screw hole 204, and a pad contact well 206. FIG. 4 is a top view of the example photo-control receptacle 100. FIG. 4 depicts the three-blade interface 202, a mounting screw hole 204, and a pad contact well 206.

Figure 5:
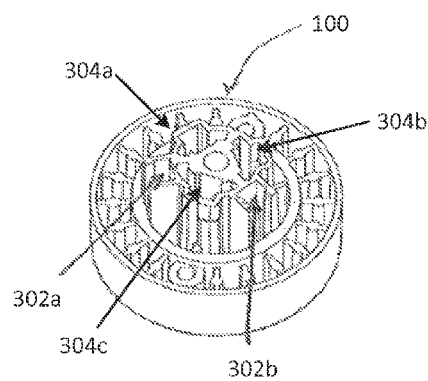
FIG. 5 is a perspective view of a bottom portion of the photo-control receptacle according to one aspect.
Figure 6:
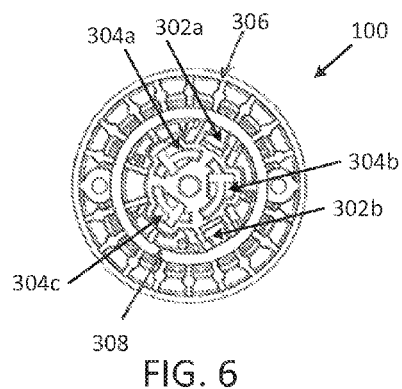
FIG. 6 is a bottom view of the photo-control receptacle according to one aspect.

FIG. 5 depicts a bottom side view of the example photo-control receptacle 100. As depicted in FIG. 5, the photo-control receptacle 100 can also include wire entries 302a, 302b for contact pad terminals 104 and blade contact entries 304a-c for blade contacts of the three-blade interface 202. FIG. 6 is a bottom view of the photo-control receptacle 100. As depicted in FIG. 6, the photo-control receptacle 100 includes a bearing surface 306 for a gasket positioned between the photo-control receptacle 100 and a luminaire and a gasket bearing surface 308 for an additional gasket positioned between the photo-control receptacle 100 and a luminaire.

Figure 7:
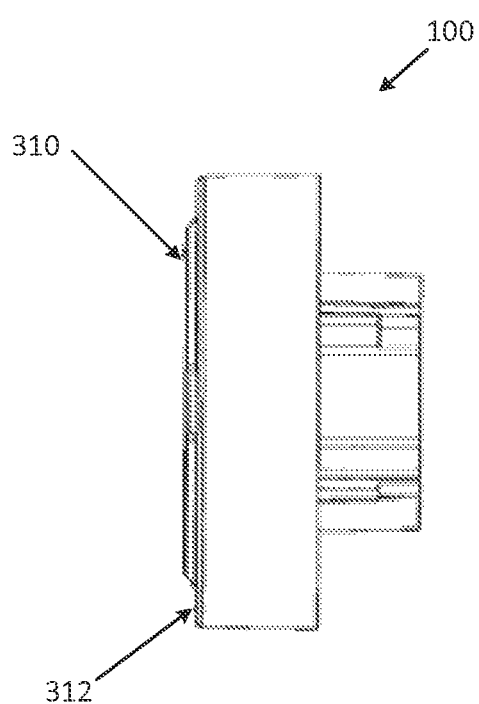
FIG. 7 is a lateral view of a photo-control receptacle according to one aspect.

FIG. 7 is a side view of the photo-control receptacle 100. As depicted in FIG. 7, the photo-control receptacle 100 includes a bearing surface 310 for the photo-control base 102 and a bearing surface 312 for a gasket positioned between the photo-control receptacle 100 and the photo-control base 102.

Figure 8:
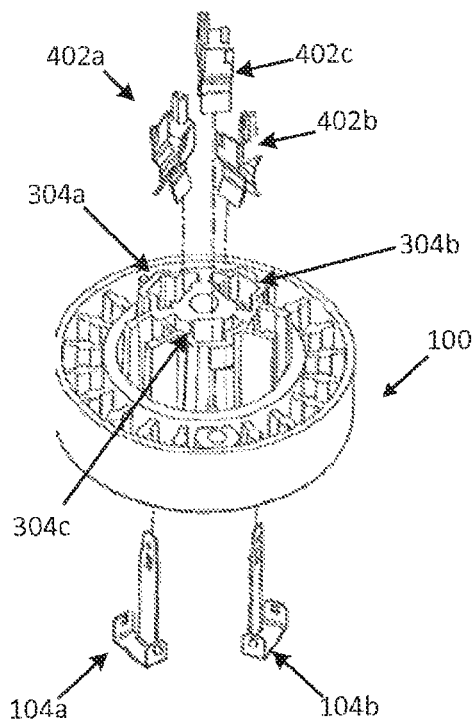
FIG. 8 is an exploded view of an example photo-control receptacle and photo-control components according to one aspect.
Figure 9:
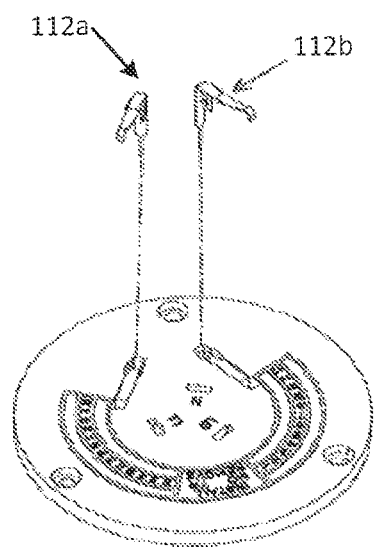
FIG. 9 is an exploded view of leaf spring terminals and a portion of a photo-control base according to one aspect.

FIGS. 8-9 depict an exploded view of an example photo-control receptacle 100. FIG. 8 depicts blade contacts 402a-c for the three-blade interface 202 that can be respectively positioned through blade contact entries 304a-c in the photo-control receptacle 100. FIG. 8 also depicts contact pad terminals 104a, 104b that can respectively positioned through wire entries 302a, 302b. FIG. 9 depicts leaf spring terminals 112a, 112b that can be positioned through the photo-control base 102.

Figure 10:
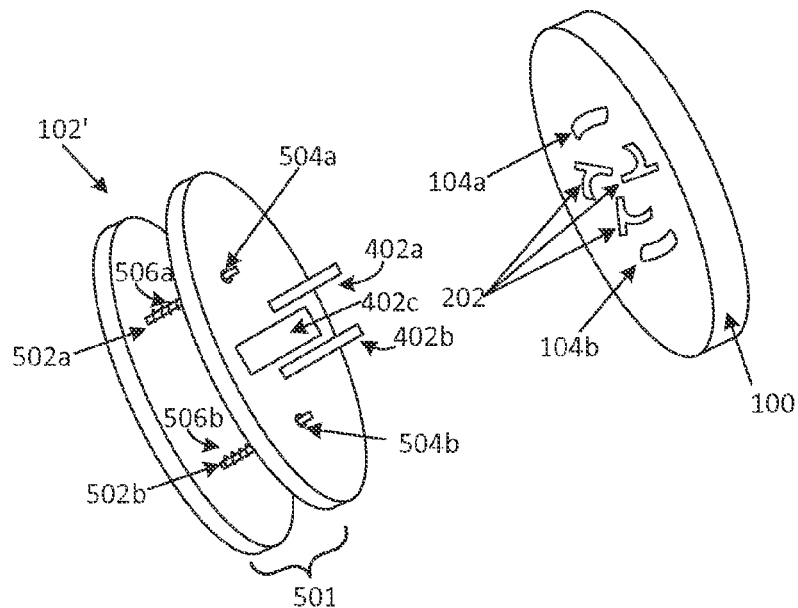
FIG. 10 is a perspective view of an alternative photo-control base having retractable contacts that can be coupled to a photo-control receptacle according to one aspect.
Figure 11:
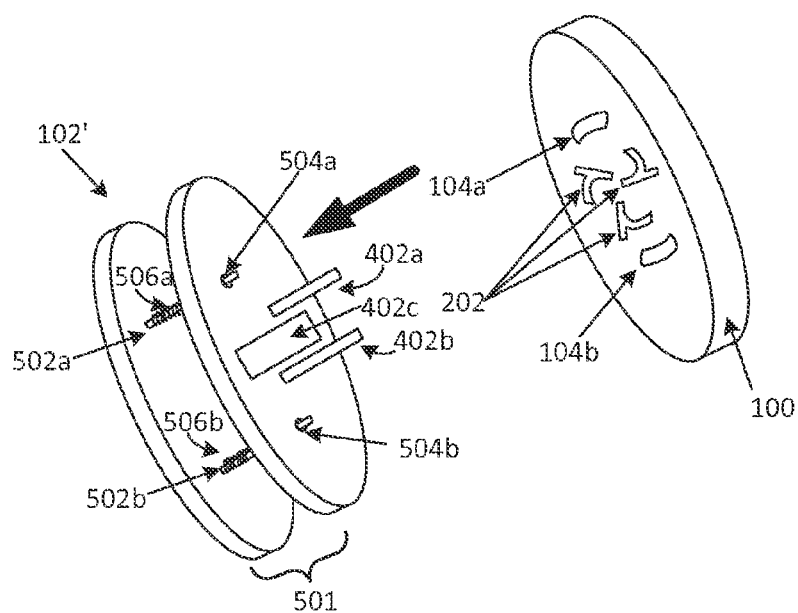
FIG. 11 is a perspective view of the alternative photo-control base the contacts retracted according to one aspect.

FIGS. 10-11 depict perspective views of an alternate photo-control base 102' that can be coupled to a photo-control receptacle 100 having contact pad terminals 104a, 104b. The photo-control base 102' can include a helical spring assembly 501. The helical spring assembly 501 can include retractable contacts 502a, 502b and helical springs 506a, 506b. As depicted in FIG. 10, the retractable contacts 502a, 502b can respectively extend through the openings 504a, 504b to respectively contact the contact pad terminals 104a, 104b. The helical springs 506a, 506b can allow one or more of the retractable contacts 502a, 502b to retract in response to a force applied to the one or more of retractable contacts 502a, 502b, as depicted in FIG. 11 by the arrow pointed to the left and angled downward. Dimming commands can be provided via the retractable contacts 502a, 502b for controlling a luminaire.

Figure 12:
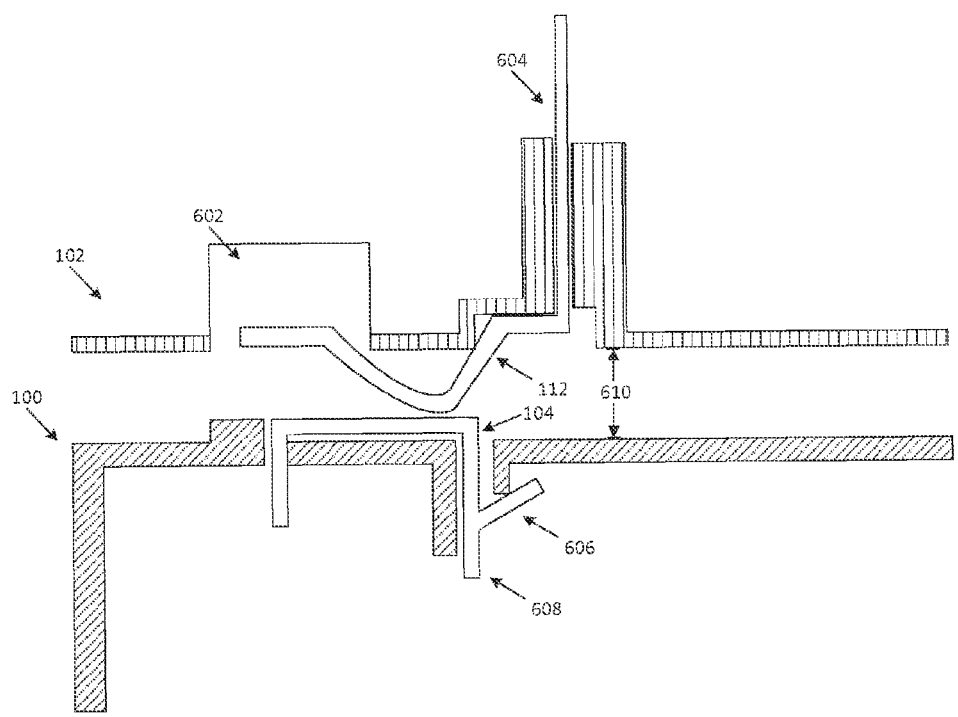
FIG. 12 is a schematic diagram of an example photo-control receptacle coupled to an example photo-control base according to one aspect.

FIG. 12 schematically depicts by cross-section an example of a photo-control receptacle 100 that can be electrically connected to a photo-control base 102. FIG. 12 depicts a leaf spring terminal 112 having one end in a contact well 602 of the photo-control base 102 and another end positioned through the photo-control base 102 and providing a solder lead 604. FIG. 12 also depicts a contact pad terminal 104 contacting the leaf spring terminal 112. Each contact pad terminal 104 can be retained in the photo-control receptacle 100 via a respective retaining lance 606. An end of a contact pad terminal 104 can provide a field wiring termination 608.

In some aspects, the arc of the leaf spring terminal 112 can have a height 610 that allows the leaf spring terminal 112 to contact the contact pad terminal 104 for cases in which the photo-control receptacle 100 and the photo-control base 102 are positioned apart from one another. In a non-limiting example, a leaf spring terminal 112 may contact a contact pad terminal 104 for a case in which a photo-control receptacle 100 is spaced 0.020 centimeters away from the photo-control base 102.

The foregoing description, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example.

What is claimed is:

1. A photo-control receptacle comprising:
   three conductors arranged in a circular pattern, wherein the three conductors are configured to form a first electrical connection for providing power to a photo-control via alternating current; and
   at least one additional contact conductor that has a flat surface in a common plane with a body of the photo-control receptacle and that is positioned external to the three conductors arranged in a circular pattern, wherein the at least one additional contact conductor is configured to form a second electrical connection for providing control signals between the photo-control and an additional device.

2. The photo-control receptacle of claim 1, wherein the second electrical connection is configured for communicating the control signals as low voltage analog control signals or digitally modulated control signals.

3. The photo-control receptacle of claim 2, wherein the at least one additional contact conductor is included in a group of two additional contact conductors configured for communicating 0-10 V analog dimming control signals, wherein the two additional contact conductors for providing the second electrical connection are electrically isolated from the three conductors for providing the first electrical connection.

4. The photo-control receptacle of claim 2, wherein the at least one additional contact conductor is included in a group of two additional contact conductors configured for communicating Digitally Addressable Lighting Interface signals, wherein the two additional contact conductors for providing the second electrical connection are electrically isolated from the three conductors for providing the first electrical connection.

5. The photo-control receptacle of claim 2, wherein the at least one additional contact conductor is included in a group of four additional contact conductors, wherein two of the four additional contact conductors are configured for communicating 0-10 V analog dimming control signals or Digitally Addressable Lighting Interface signals and another two of the four additional contact conductors are configured for communicating additional low voltage signals.

6. The photo-control receptacle of claim 1, wherein the at least one additional contact conductor comprises a plurality of contact pads.

7. The photo-control receptacle of claim 1, wherein the at least one additional contact conductor is positioned to mate with a contact of the photo-control and has a surface adapted to contact a terminal of the photo-control.

* * * * *